Sept. 3, 1935.  P. S. SHIELD  2,013,510
FILLING OF TRUCK TANKS
Filed Oct. 14, 1931  2 Sheets-Sheet 1
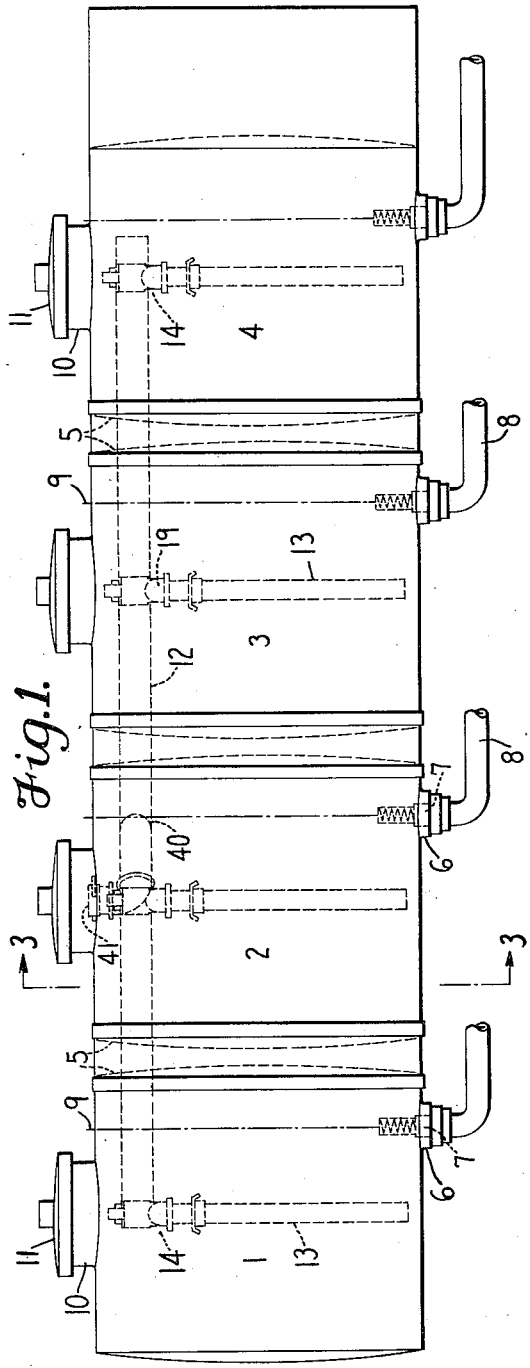
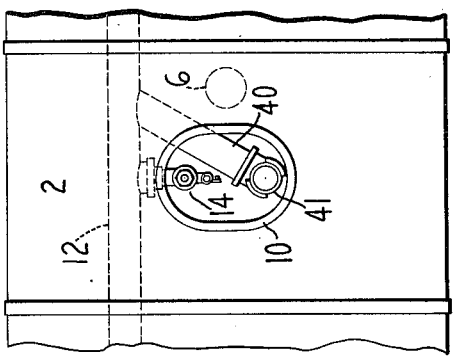
INVENTOR
Paul S. Shield
BY
J. F. Brandenburg
ATTORNEY Sept. 3, 1935. P. S. SHIELD 2,013,510
FILLING OF TRUCK TANKS
Filed Oct. 14, 1931 2 Sheets-Sheet 2
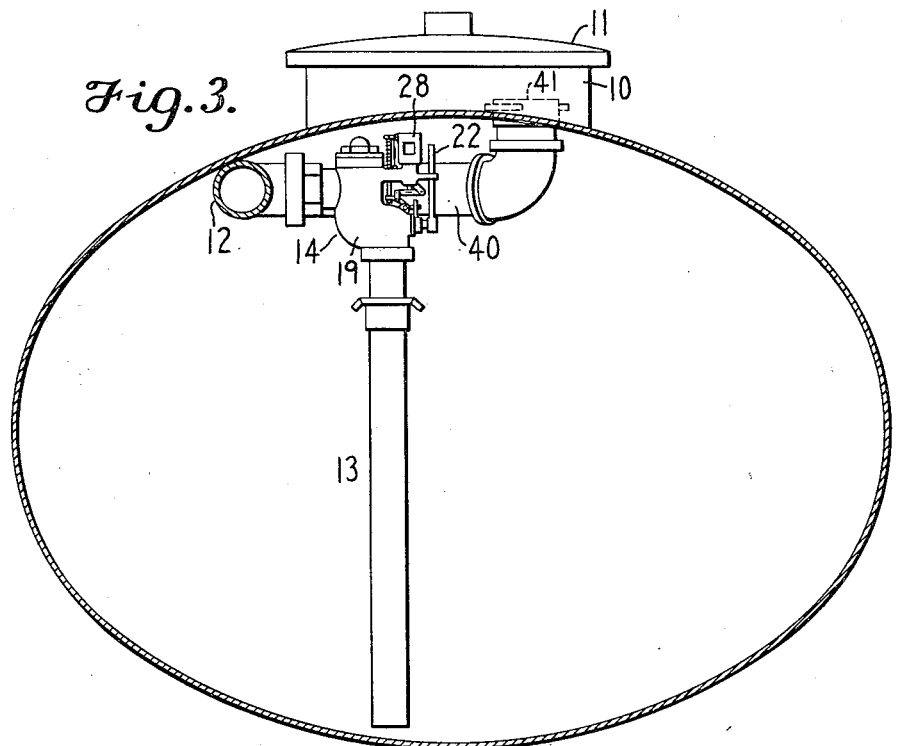
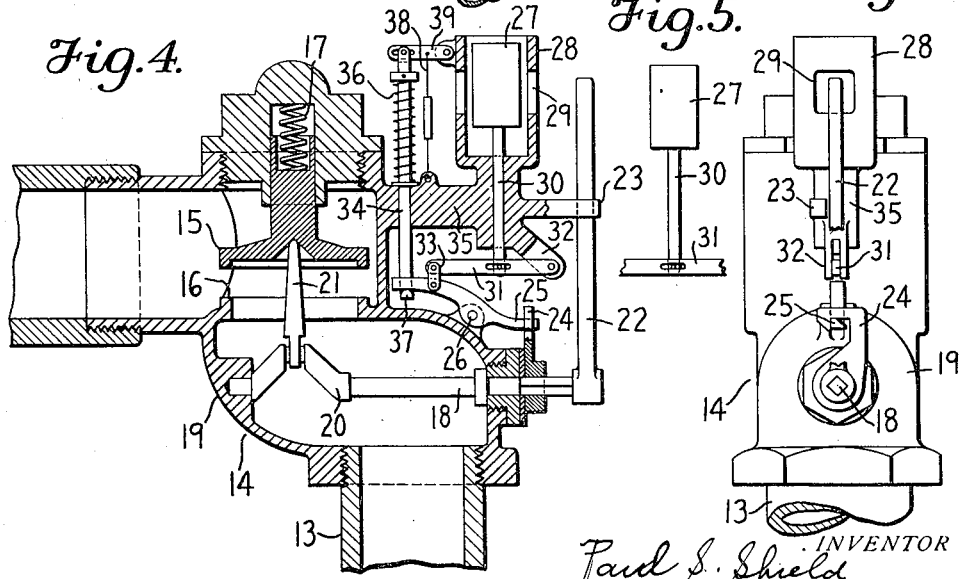
INVENTOR
Paul S. Shield
BY
J. F. Brandenburg
ATTORNEY Patented Sept. 3, 1935

2,013,510

UNITED STATES PATENT OFFICE 2,013,510

FILLING OF TRUCK TANKS

Paul S. Shield, Cincinnati, Ohio, assignor to Augustine Davis, Jr., Cincinnati, Ohio Application October 14, 1931, Serial No. 568,741

15 Claims. (Cl. 220—86)

The object of this invention is to provide means for simultaneously, quickly, safely and accurately filling the compartments of multiple compartment truck tanks, through piping and valves built into the tank and independent of the piping and the outlet or "emergency" valves through which deliveries of liquid are made from the tank. An object is to cause the shutting off of the filling of the various compartments to be entirely automatic and not dependent on an attendant racing from compartment to compartment in an attempt to stop the filling of each compartment when gasolene or other liquid reaches an exact level therein. Another object is to avoid wasteful or dangerous discharge of liquid remaining in the filling hose when this hose is detached from the piping of the tank, or the alternative necessity for providing this hose with a valve at its end, but on the contrary to make provision so that when the flexible connection is broken the gasolene in the hose will drain into one of the compartments of the tank, the exact measurement of the total quantity filled into this compartment being insured by means later described.

In the accompanying drawings forming part hereof:

Fig. 1 is a side elevation of a truck tank to which the invention is applied;

Fig. 2 is a fragmentary plan view;

Fig. 3 is a vertical, transverse section;

Fig. 4 is a vertical section on a larger scale illustrating a construction suitable for the automatic filling valves;

Fig. 5 is an illustration of part of the float device of a compartment in which the filling is to be shut off at a lower level than in other compartments; and Fig. 6 is an elevation looking from the right in Fig. 4.

The truck tank is shown, for purpose of illustration, as having four compartments 1, 2, 3 and 4, which are entirely separated from each other by the partition heads 5. Each compartment has a bottom outlet 6, commanded by a spring-closed emergency valve 7, these valves when closed preventing any flow of liquid from the compartments to the delivery pipe or pipes 8. These pipes may be understood as having usual delivery valves or faucets at their outer ends. The means for operating the emergency valves, either by unit control or selectively, is not material to the invention. Operating connections 9 passing through the tops of the compartments are indicated schematically.

The tops of the compartments have manholes 10 closed by covers 11. The term "manhole" is used descriptively, since the openings may be on the order, in size, of handholes or fill-holes.

A longitudinal filling header 12, preferably a three-inch pipe closed at its ends, extends within all the compartments, near the top, and through the partition heads, to which it is secured in a firm and liquid-tight manner. From this header, downtake pipes 13, preferably of two-inch size, drop to near the bottoms of the several compartments.

At the junctions between the downtakes and the headers, and in or beneath the manholes, are automatic filling valves 14. The valve elements 15 of these valves are urged toward their seats 16 by springs 17, and means are provided for catching them in the open positions and for releasing or tripping them as each compartment becomes filled to its measured capacity, that is to say totally full except for the expansion space that it may be necessary to leave.

The specific construction of these valves may be varied, that shown in Figs. 4 and 6 being illustrative. A rock-shaft 18, journaled in the valve body 19 and extending through a stuffing-box in one wall, has a crank 20, to which a thrust pin 21 is pivoted to lift the valve element away from its seat when the rock-shaft is turned in one direction. A handle 22, fixed on the outer end of the rock-shaft, is accessible through the manhole, and a stop 23 projecting from the valve body limits the movement of this handle in the direction of operation that opens the valve. A catch-arm 24, also fixed on the rock-shaft, has a hooked and beveled end to engage automatically with a catch lever 25 pivoted at 26 on the valve body.

The catch-levers 25 of the filling valves of the several compartments are controlled by individual floats 27, which are disposed to operate at levels above the valves or above the downtakes 13, to release each valve when the filling of that compartment brings the liquid to predetermined proximity to the top.

These floats are preferably contained in float-chambers 28, provided with openings 29 and supported on the outside of the valve bodies 19, and have stems 30 which extend downward and are connected with levers 31, pivoted on fixed lugs 32, these levers, in turn, being connected by links 33 with the catch levers 25. The float chambers have lateral openings. By these or other suitable connections, the lifting of the floats by the rising liquid causes tripping of the filling valve elements 15, each of which at the moment of its tripping, whenever that may be, is closed by its spring 17.

Another feature of the invention causes automatic closing of any one of the filling valves in event of the gasolene vapors taking fire in a compartment during filling. To this end, compartment filling valves are placed under double control, that is to say under the filling control by the floats and under an emergency release control by thermal devices, these two controls being combined with the valves in such manner that each acts under the proper circumstances without interference of either by reason of the presence of the other. In the particular construction illustrated in the drawings, a tripping plunger 34 is guided in a bracket 35 extending from the valve body 14 and is acted upon by a spring 36. The lower end of this plunger has a portion 37 which underlies the tail of the catch lever 25, so that when and if the spring 36 is free to act, it will throw the plunger up and trip the lever. Under all ordinary circumstances, however, the springs of the thermal release devices in the respective compartments are restrained by readily fusible wires or elements 38. In Fig. 4 the fusible element is shown tying an arm 39 to the bracket 35, the arm 39 being pivoted to the float chamber or other support and the arm being connected to the upper end of the plunger. The bracket 35 may be, also, the support for the float chamber and the stop 23. The relations of the floats and of the thermal devices to the mechanisms for holding the filling valves open during filling are such that the operation of the floats to trip the valves is independent of the fusible devices, which continue to be restrained, and on the other hand, that any one of the thermal releases devices can effect closing of its valve notwithstanding that the corresponding float would be down at the time.

The header is preferably disposed at one side of the manholes. A filling or connection branch 40 extends from the manifold to a point beneath or readily accessible to the manhole of compartment 2, for example, where it has a quick-coupling connection 41 for the attachment of the end of a filling hose, when the cover of this compartment is open. The automatic shut-off of this particular compartment is so calibrated that it stops the filling of the compartment at a level enough below its stated capacity, so that, when the valve behind the hose is closed and the hose is disconnected and its contents allowed to run into the compartment, the compartment will be full to that capacity.

Assuming that the tops of all the compartments are on a level, the float mechanisms of compartments 1, 3 and 4, for example, would be calibrated to release the filling valves of these compartments at the same level. The float of the compartment containing the detachable connection for the filling hose can be easily set to operate at a somewhat lower level by making the stem 30 of this float shorter than the others by the proper amount. This is illustrated by Fig. 5 in comparison with Fig. 4.

The operation is as follows:

During filling, the emergency valves remain closed, and the invention requires no change in these valves. The filling of the compartments through the downtakes is a feature of safety and economy, since as soon as some gasolene is delivered into each compartment the remainder will be discharged beneath the surface. Consequently it will not vaporize and spray as it would if the stream fell through the air. The automatic filling valves, with their control floats located above the valves, cause the filling of each compartment to cease, without attention on the part of the attendant when the liquid reaches the calibrated full level. This is true even though certain compartments fill faster than others or though the compartments be of different capacities.

The shut-off of the compartment having the quick-coupling connection for the filling hose operates at a level sufficiently lower than the final levels in other compartments to allow quite exactly for the amount of liquid that will be drained into this compartment from the hose after disconnection. This obviates waste and hazard in disposing of the contents of the hose.

In event of the gasolene in any compartment taking fire during filling, the fusible release device of that compartment causes an immediate shutting off of the flow.

I claim:

1. In combination with a truck tank subdivided into separate compartments, said compartments having manholes with covers at the top and valved outlets for drawing off the liquid, filling means independent of the valved outlets comprising a common piping fixed in the interior of the tank and having branches to deliver the filling liquid into the several compartments, valves independently controlling said branches, said piping being further provided with an intake branch having a coupling connection located in one of the compartments so as to receive the end of a filling hose when the manhole cover of that compartment is open.

2. In combination with a truck tank subdivided into separate compartments having valved outlets for drawing off the liquid, filling means independent of the valved outlets comprising a header pipe extending within the upper parts of the compartments through the divisions between the compartments, downtake pipes extending from said header pipe to near the bottoms of the several compartments, valves for independently shutting off the flow through said downtake pipes, and an intake connection to said header pipe located in one of the compartments, said compartment having an opening in its top provided with a cover, opening of which affords access to said inlet connection.

3. In a multiple compartment truck tank, filling means comprising piping fixed in the interior of the tank and having branches to deliver the filling liquid into the several compartments, automatic valves for stopping flow through the respective branches, and float-controlled means located in each of the compartments and controlling said valves independently to cause each of them to close when its compartment becomes substantially full.

4. In a multiple compartment truck tank, filling means comprising piping fixed in the interior of the tank and having branches to deliver the filling liquid into the several compartments, automatic valves for stopping flow through the respective branches, and float means controlling said valves independently to cause each of the valves to close when its compartment becomes substantially full, the floats of said means being located in the upper parts of the compartments above the valves which they control.

5. In combination with a multiple compartment truck tank, filling means comprising piping fixed in the interior of the tank and having branches to deliver the filling liquid into the several compartments, said piping being further provided with an intake branch having a coupling connection located in one of the compartments to receive the end of a filling hose, said compartment having an opening in its top provided with a cover, opening of which affords access to said inlet connection, automatic valves for stopping flow through the other respective branches, and float-controlled means located in each of the compartments and controlling said valves independently to cause each of them to close when its compartment becomes substantially full.

6. In combination with a multiple compartment truck tank, filling means comprising piping fixed in the interior of the tank and having branches to deliver the filling liquid into the several compartments, said piping being further provided with an intake branch having a coupling connection located in one of the compartments to receive the end of a filling hose, said compartment having an opening in its top provided with a cover, opening of which affords access to said inlet connection, automatic valves for stopping flow through the other respective branches, and float-controlled means located in each of the compartments and controlling said valves independently to cause each of them to close when its compartment becomes substantially full, the float-controlled means of the compartment containing said intake connection being so devised as to close the filling valve of this compartment at a lower filling level than that attained in the other compartments.

7. In combination with a multiple compartment truck tank, filling means comprising a header pipe extending within the upper parts of the compartments through the divisions between the compartments, downtake pipes extending to near the bottoms of the several compartments, automatic valves connected between the downtake pipes and the header pipe, and float-controlled means located in each of the compartments and controlling said valves independently to cause each of them to close when its compartment becomes substantially full.

8. In combination with a truck tank subdivided into separate compartments, said compartments having manholes with covers at the top and valved outlets for drawing off the liquid, filling means independent of the valved outlets comprising a header pipe extending within the upper parts of the compartments, downtake pipes extending to near the bottoms of the several compartments, an intake branch having a coupling connection beneath one of the manhole openings to receive the end of a filling hose when the cover of that compartment is open, automatic valves connected between the downtake pipes and the header pipes, and float-controlled means located in each of the compartments and controlling said valves independently to cause each of them to close when its compartment becomes substantially full.

9. In combination with a multiple compartment truck tank, filling means comprising piping fixed in the tank and having branches to deliver the filling liquid into the several compartments, automatic valves for cutting off flow through the respective branches, float-controlled means located in each of the compartments and controlling said valves independently to cause each of them to close when its compartment becomes full, and thermal release devices also associated with the several valves for causing the valves to close.

10. In combination with a truck tank subdivided into separate compartments having valved outlets for drawing off the liquid, filling means independent of the valved outlets comprising a header pipe extending within the upper parts of the compartments through the divisions between the compartments, and a downtake pipe in each compartment extending from the header to near the bottom of the compartment so that during substantially the entire filling of the compartments the liquid supplied through the header and downtakes discharges below the surface of the liquid already in the compartments and thereby avoids splashing and its resulting spray and vapor.

11. The combination with a vehicle tank for transporting inflammable liquids, of a conduit communicating with the tank, a valve in said conduit, a spring urging the valve toward closed position, means for opening said valve, a latch for holding the valve open, and thermal responsive means for releasing said latch to cause said spring to close the valve in case of fire.

12. A truck tank for transporting inflammable liquids, a conduit communicating with the interior of the tank, a valve in said conduit, means for closing said valve including a thermal responsive device for causing the valve to close in case of fire, and a handle for opening and closing the valve independently of the thermal responsive device.

13. In combination with a multiple-compartment truck tank for inflammable liquids, filling means comprising piping to deliver liquid into the several compartments, valves for controlling the flow to the respective compartments, and an automatic operating mechanism associated with each valve to close the valve independently of the other valves, said operating mechanism including thermal responsive means located in position to be operated by heat from a fire in its respective compartment so that in case of fire the supply of liquid to that compartment is automatically cut off.

14. The combination with a vehicle tank for transporting inflammable liquids, of a conduit communicating with the tank, a valve in said conduit, a spring urging the valve into closed position to stop the flow of liquid into the tank, means for locking the valve in open position, thermal responsive means operatively connected with the locking means to release said locking means in case of fire, means responsive to the liquid level in the tank for causing the valve to close when the liquid reaches a predetermined level, connections between the liquid-level responsive means and said locking means by which the locking means are released independently of the thermal responsive means.

15. The combination with a truck tank comprising a plurality of compartments for inflammable liquids, of filling means including piping to deliver liquid into the several compartments, valve means for controlling the flow of liquid to the compartments, including thermal responsive means for cutting off flow to said compartments in event of fire.

PAUL S. SHIELD.